United States Patent
Sitbon et al.

[11] Patent Number: 6,064,813
[45] Date of Patent: May 16, 2000

[54] TOOL FOR INTEGRATING APPLICATIONS FOR A DATA PROCESSING PLATFORM

[75] Inventors: Gérard Sitbon, Vitry; Christian Baillif, Bourg la Reine; Armand Nachef, Montigny le Bretonneux, all of France

[73] Assignee: Bull S.A., Louveiennes, France

[21] Appl. No.: 08/960,357

[22] Filed: Oct. 29, 1997

[30] Foreign Application Priority Data

Oct. 31, 1996 [FR] France .................................. 96 13302

[51] Int. Cl.$^7$ ................................. G06F 9/445
[52] U.S. Cl. .................................................. 395/701
[58] Field of Search .................... 395/706, 712, 395/701

[56] References Cited

U.S. PATENT DOCUMENTS 5,075,847 12/1991 Fromme ................................. 395/705
5,418,941 5/1995 Anthony .............................. 395/183.14
5,551,030 8/1996 Linden et al. ......................... 707/102

OTHER PUBLICATIONS

Ingenuity, vol. 9, No. 1, May 1, 1994; pp. 012–121, XP000460303 Duxbury P: "Legacy Systems in Client–Server Networks: A Gateway Employing Scritped Terminal Emulation".

Chang. Helping Users to Install and Delete. PC User. p. 81.

*Primary Examiner*—Tariq R. Hafiz
*Assistant Examiner*—Wei Zhen
*Attorney, Agent, or Firm*—Kerkam, Stowell, Kondracki & Clarke, P.C.; Edward J. Kondracki

[57] ABSTRACT

The present invention relates to an application integration tool for integrating applications into a data processing platform which includes structure for hosting applications, making it possible for applications editors and customers having at least one application to integrate, to configure the services of the platform so that the application will be supported by the platform as soon as it is installed. The integration tool allows any application to be integrated to benefit automatically from the services offered by the platform as soon as it is installed, and facilitates the launching of applications at a plurality of sites.

5 Claims, 3 Drawing Sheets

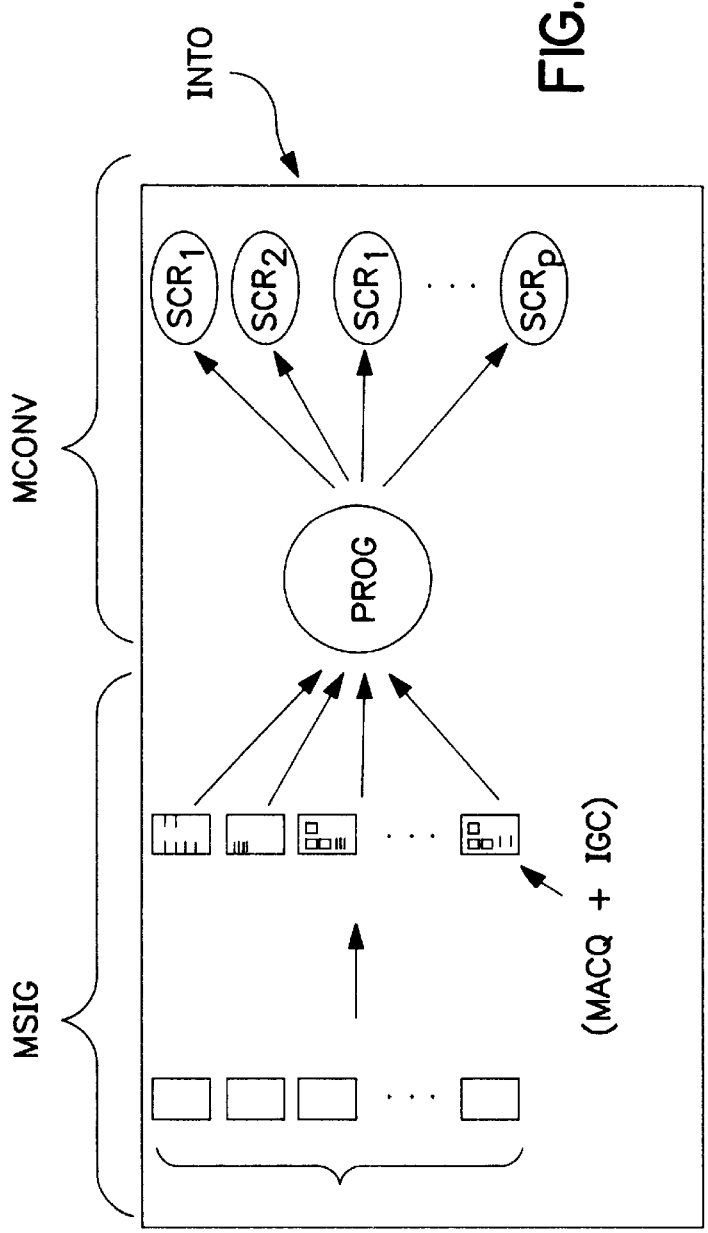
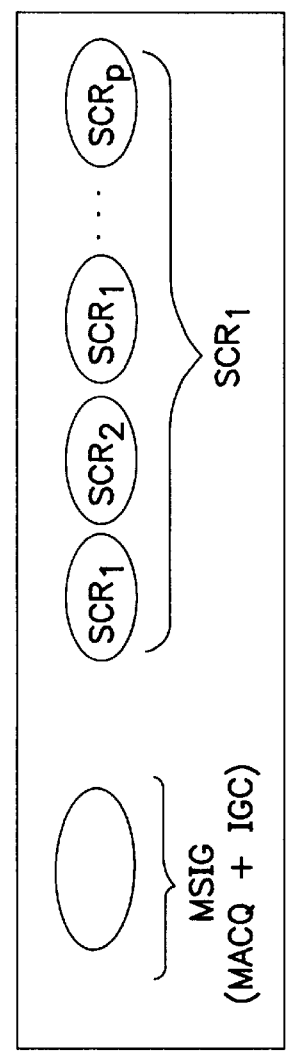
FIG. 3a
FIG. 3b

TOOL FOR INTEGRATING APPLICATIONS FOR A DATA PROCESSING PLATFORM

CROSS REFERENCE TO RELATED APPLICATIONS

Application No. 95 01236 corresponds to U.S. application Ser. No. 08/595,002, filed Jan. 31, 1991, in the name of Gérard Sitbon et al. Application No. 95 08851 corresponds to U.S. application Ser. No. 08/683,413, filed Jul. 19, 1996. Application No. 95 08851 corresponds to U.S. application Ser. No. 08/886,477, filed Jul. 1, 1997. Each of said applications are assigned to the assignee of the present invention and the subject matter of each of application, Ser. Nos. 08/595,002, 08/683,413 and 08/886,477, is hereby incorporated herein by reference.

BACKGROUND OF THE INVENTION

1. Field of the Invention

The present invention relates to a tool for integrating applications for a data processing platform constituted by a network of machines running a plurality of heterogeneous applications.

2. Description of Related Art

In current practice, these platforms are systems which are most often "production oriented systems." In this respect, they have the same function as the traditional "mainframes" from high-end computer manufacturers. This means that they must exert a high level of control over requests for services from the client-user ("customer service requests").

Generally, a platform of this type is delivered to the customer that ordered it, equipped with software integrated at the manufacturer's assembly plant. Part of this software is constituted by service applications whose purpose is to improve the administration, security, availability, automation and productivity of the platform.

For simplicity of language, in the text below a "service application" will be designated by the term "service."

However, at any time, the client may need to integrate a new application in such a way that it is supported by these services, in as short a time as possible.

The integration of the application takes place after its development phase. It must be carried out without tampering with the source code of any of the compiled programs of the platform.

It will be recalled that an application is a set of objects, which may be:

programs, transactions, libraries, scripts (command scripts to one skilled in the art), description files and data, configuration files, print report group, log files, etc.

In order to support the application to be integrated, each service offered by the platform must provide an interface with the objects of this application without modifying them. For example, if the application supplies log files, it can be managed by monitoring these files.

Generally, a platform comprises dozens of services. Each of these has its own mechanism for integrating any application to be installed. In general, it has a graphical interface of its own which allows it to integrate the application installed. Graphical interfaces of this type are described, for example, in the French patent applications Nos. 95 01236, 95 08851 and 96 08161 filed by the assignee of said applications with the respective titles "Tool for generating and executing graphical interface commands", "Application integration architecture for a data processing platform", AND "Protected application launcher with graphical interface". Including the time required to train human operators to perform it, the integration requires at least half a day (sometimes several days) per service, that is, at least one week for ten services. It must also be noted that once the application has been integrated into a service, it is then necessary to learn how to use it: integration and utilization are two separate and independent processes. Therefore, the integration of a new application is an expensive operation.

Moreover, with the current technology, the risk of error during an integration is high, since it is most often performed by customers too rapidly. Furthermore, with this method, the launching of each application to be integrated is long and difficult, since it is necessary to repeat the same operations at each site (the geographical location where a machine belonging to the platform is located).

SUMMARY OF THE INVENTION

The present invention makes it possible to eliminate the above-mentioned drawbacks by creating, at the platform level, a structure for hosting applications, making it possible for applications editors and customers having at least one application to integrate, to configure the services of the platform so that this application will be supported by the latter as soon as it is installed. In other words, the tool according to the invention allows any application to be integrated to benefit automatically from the services offered by the platform as soon as it is installed, and facilitates the launching of applications at a plurality of sites.

According to the invention, the tool for integrating applications for a data processing platform constituted by a network of machines running a plurality of specific services of the platform is characterized in that it comprises:

means for entering information for integrating the new application so as to allow it to be supported by all or some of the services, means for converting the integration information into a set of commands for integrating the application into the services.

In a preferred embodiment of the invention, the entry means are constituted by the combination of means for acquiring information on the properties of the application to be integrated and a graphical interface for collecting this information and transmitting it to the conversion means.

Preferably, the conversion means are constituted by software which produces, from the properties information, scripts specific to each service which allow the application to be automatically integrated into the services.

Other characteristics and advantages of the present invention will become apparent in the following description given as a non limiting example in reference to the appended drawings.

BRIEF DESCRIPTION OF THE DRAWINGS

FIG. 3, composed of FIGS. 3a and 3b, shows the characteristic elements of the integration tool according to the invention and how they work.

DESCRIPTION OF THE PREFERRED EMBODIMENTS

Figure 1:
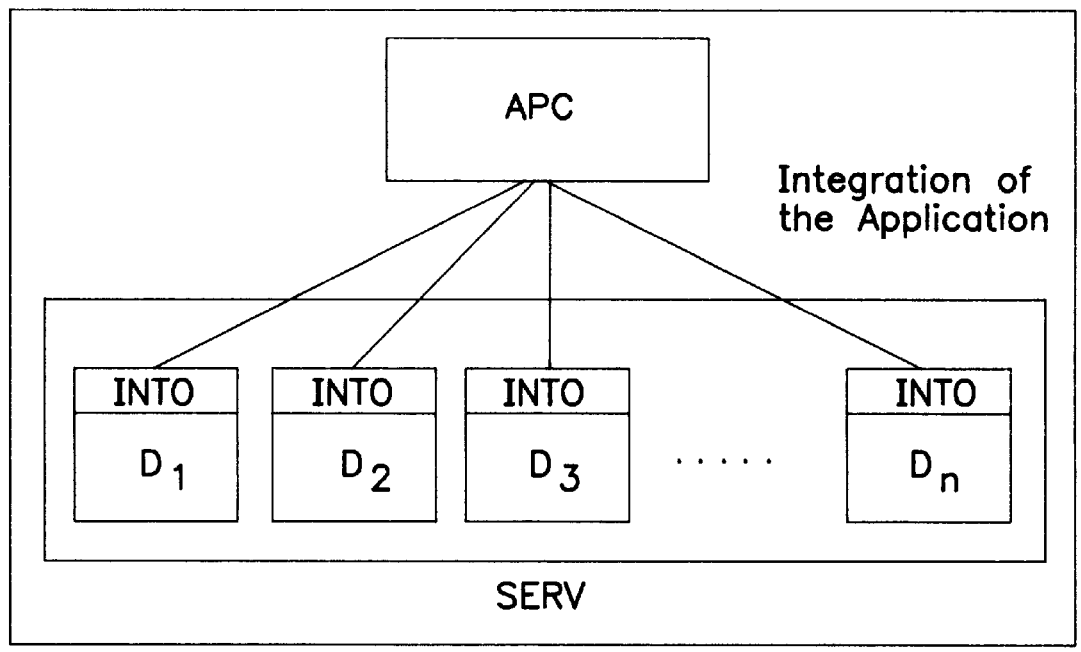
FIG. 1 schematically illustrates the problem that the invention must solve.
Figure 2:
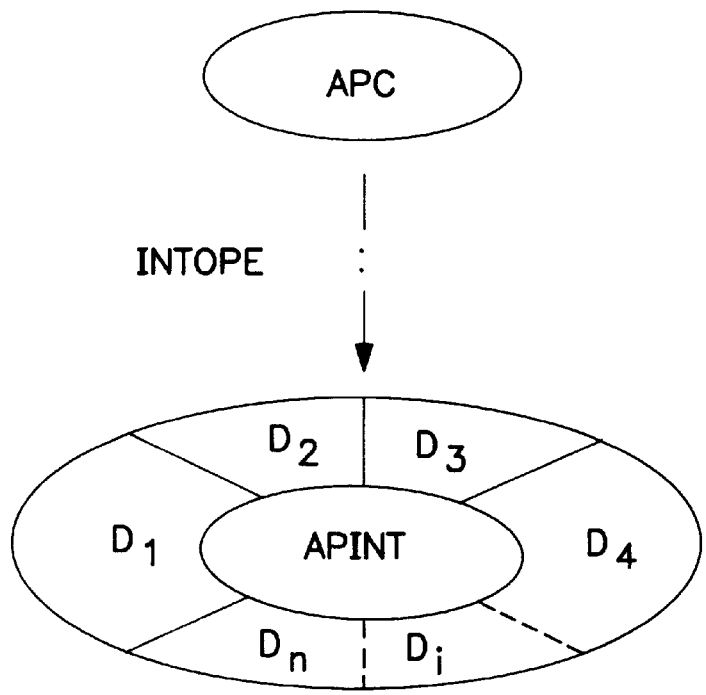
FIG. 2 schematically shows how a customer's application is integrated into the various integral domains.

1) THE ESSENTIAL CHARACTERISTIC ELEMENTS:

Refer to FIGS. 1 and 2.

FIG. 1 represents a platform PL sold by its manufacturer to a customer C. The platform is delivered to the later equipped with a certain number of integrated services SERV. The latter are divided into a plurality of activity domains D1 through Dn, for example six of them numbered D1 through D6, a detailed description of which may be found in the above-mentioned patent application No. 96 08161.

It is assumed that the customer C has designed an application APC and completed its development phase. He wishes to integrate it into PL.

In order to do this, he uses the application integration tool INTO according to the invention, which makes it possible, as seen in FIG. 1, to configure the services SERV so that they support APC. For this purpose, INTO supplies it with values added to any of the integration domains D1, D2, D3, . . . , D6 of the platform.

Each of these six domains comprises, for example, a certain number of properties, which are listed in the table below:

| Domain | Properties |
| --- | --- |
| Platform | Distribution of the application to the machines of PL |
| | Management of the versions |
| | Management of the size of the log files associated with the application |
| Graphical | Integration into the control panel |
| | Incorporationofthecommandsintolinesof theapplication |
| Operations | Scheduler of the program launching device and administration of the automation |
| | Management of print operations |
| | Management of backups |
| Administration | Integration of event management |
| | Integration of the analysis of log files for sending events or executing commands |
| | Integration of applications management |
| | Transaction management |
| | Data base management |
| | Performance management |
| | Accounting management and cost breakdown |
| High Availability | Management of the takeover of resources with high-availability techniques |
| | File restoration management |
| Security | Access control management |
| | Integration with firewalls (known security devices) |

In order to integrate APC into PL, the tool INTO executes a certain number of integration operations INTOPE.

In FIG. 2, this integration is symbolized by showing APC, represented by an elliptical geometric shape, surrounded by the six domains D1 through D6 listed above.

Once integrated, it includes added values belonging to all or some of the six domains, it being understood that it is not necessary to integrate it into all of them.

Refer to FIG. 3a.

The integration tool INTO comprises:

means MSIG for entering information for integrating APC which allows it to be supported by all or some of the services SERV, means MCONV for converting the integration information into a set of commands SCRi for integrating the application into the services SERV.

The means MSIG comprise:

means MACQ for acquiring information on the properties of the application to be integrated, a graphical interface IGC for gathering this information and transmitting it to the conversion means.

The conversion means MCONV comprise:

software PROG which produces, from the properties information provided by the graphical interface, scripts SCR1, SCR2, SCR3, SCRi, SCRp specific to each service, which make it possible to integrate APC into the services SERV automatically.

In order to better understand how the integration tool INTO is structured and how it operates, it is useful to recall the information indicated in the following paragraph.

In order for a service application belonging to the set SERV to be configured with a command language, this application must be able to understand this language. This is even true in the case where most of the new applications have only one public interface that is graphical. These applications generally have either files (non public) which are configured through the graphical interface, or an internal command language known only to the developer, which is located downstream from the graphical interface.

On the other hand, the tool according to the invention INTO requires that the configuration files and the command languages of the service applications be public. The description of these files and/or command languages is contained in a guide PG (abbreviation for Programming Guide) to be sent to the applications integrators in order to guarantee the stability of the operation of the application once it is integrated.

In keeping with what has been summarized in the last two paragraphs, the information acquisition means MACQ are constituted by a set of forms, each of which corresponds to a predetermined service and is supplied to the software editor or to the human operator wishing to integrate the application APC.

These forms can be, for example, placed on the INTERNET network or recorded on a data recording medium such as a magnetic disk, diskette, magnetic tape, CD-ROM, etc. Each form includes questions, to be filled in by the editor, concerning the properties of APC. Once the form has been filled in, it is introduced by means of the graphical interface IGC into the software PROG, which then generates a "script" SCRi.

The execution of this script SCRi makes it possible to integrate this application APC into the service of SERV which is associated with the filled-in form. It can only take place after the installation of APC by the customer into the platform PL.

It must be noted that the forms can be supplied by the manufacturer to its customers through an HTTP (Hyper Text Transfer Protocol) server belonging to the INTERNET network, by means of specific forms called "FORM" in the standardized language HTML (Hyper Text Mark-up Language) widely used in this network, and that the program PROG which generates the scripts can be a standardized CGI (Common Gateway Interface) program.

Consequently, for each application APC to be integrated into PL, the software PROG generates a set of scripts SCRi (one script per service). These scripts are executed at the end of the installation procedure specific to PL, and they allow the installed application APC to be recognized by the services SERV (control panel, archives, event administration, security, etc.).

Thus, the invention allows the customer to reduce the time required to integrate APC from several days to several minutes. The exact integration times, of course, depend on the level of integration, that is, the number and the complexity of the services into which it needs to be integrated.

It must be noted that it is not always possible for the software PROG to generate an integration script SCRi for each service application. In this case, it is necessary to provide the editors with documentation which will allow them to develop the scripts themselves.

II) DESCRIPTION OF A PARTICULAR EXEMPLARY EMBODIMENT

For a better understanding of the invention, it is appropriate to illustrate it more precisely, choosing as the application APC an application based on the standard transaction monitoring program known by the name "TUXEDO", and choosing as the service "TROUBLESHOOTING", which is a service of PL that allows the administrators of "TUXEDO" applications to monitor them in real time, via a graphical interface and a control panel. "TUXEDO TROUBLESHOOTING", which is customarily designated by its abbreviated name TTH, makes it possible to supervise a plurality of TUXEDO applications from a central point, no matter what their physical locations in the network. It makes it possible, with a simple look at the control panel associated with the graphical interface, to view the operation of several TUXEDO applications, by displaying the status of the resources of each application (on or off). This service also detects serious events, analyzes the context of these events and proposes corrective action.

It is assumed that in this particular exemplary embodiment, the application APC to be integrated into TTH is given the name "APPLI3" and that its integration must result in its automatically appearing in the control panel of TTH after its installation into PL.

Figure 4A:
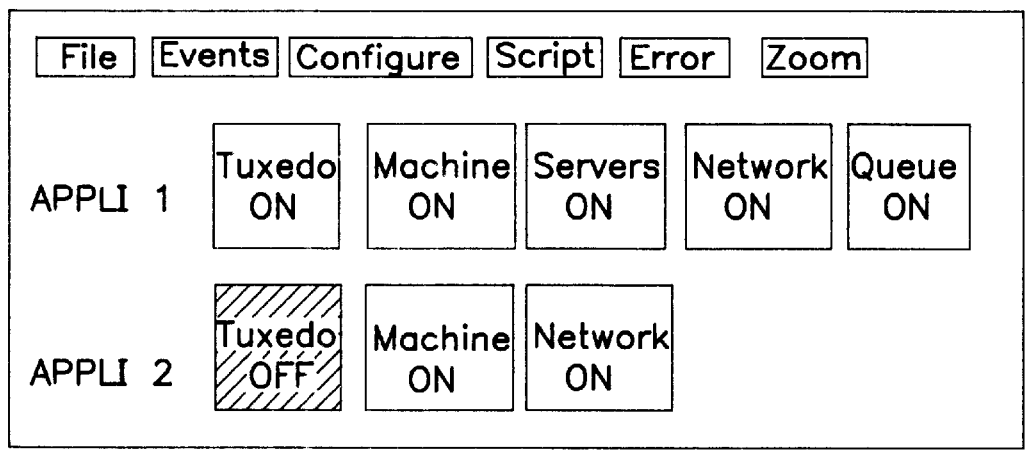
FIG. 4, composed of FIGS. 4a and 4b, illustrates the control panel of the graphical interface (the screen display of this interface) belonging to the means for entering information for integrating the application belonging to the integration tool according to the invention, for a specific set of services.
Figure 4B:
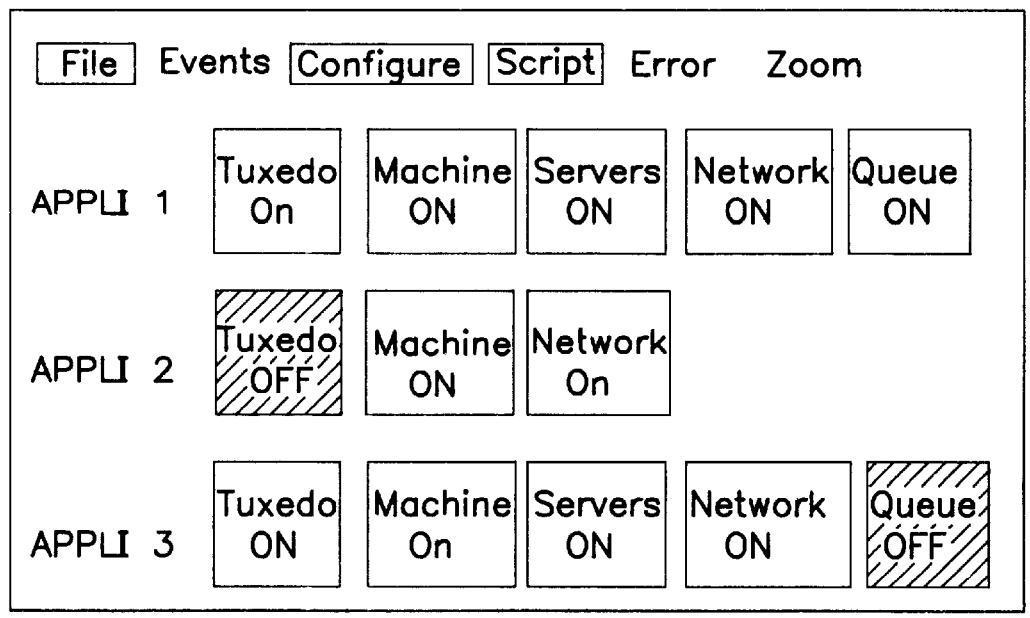

FIG. 4 illustrates the control panel of TTH before and after the integration of "APPLI3", with FIG. 4a showing the state of this control panel before the integration and FIG. 4b showing its state after the integration.

As seen in FIG. 4a, before integration, TTH comprises two applications named "APPLI1" and APPLI2", and the control panel displays the status of their resources (ON or OFF) in boxes, of which there are 5 for the first application and 3 for the second.

Thus it is possible to see that, for the first application, all of the resources, called Tuxedo, Machine, Servers, etc., are in operation (ON), whereas for the second one, the resources Machine and Network are in operation (ON) while the resource Tuxedo is out of operation (OFF).

Likewise, it may be seen in FIG. 4b that after integration, TTH now includes "APPLI3" in addition to the two preceding applications "APPLI1" and "APPLI2", and that it displays the status of 5 resources, namely Tuxedo, Machine, Servers, Network and Queue, the first four of which are on while the last one is off.

Appendix 1 shows the complete embodiment of the acquisition means MACQ (form) specific to TTH made available to the "TUXEDO" editor in order to be completed so as to start the operations INTOPE for integrating "APPLI3".

This form includes 10 lines L1 through L10, each of which indicates the nature of the information to be provided (left column), the coded name of the latter (center column) which will be supplied to the software PROG and comments related to each of these pieces of information (right column).

From the data on the form, which will be supplied by means of the graphical interface IGC of the tool INTO, the software PROG generates the script shown in Appendix 2.

This script also includes 10 lines L1 through L10, which strictly correspond to the 10 lines of Appendix 1.

In the case of a TUXEDO application, the script SCRi generated after the form is filled in will request the name of the connection to the platform PL of the administrator of the application APPLI3 as well as that of its master machine in the TUXEDO environment (within the framework of this standard, each application has a master machine). SCRi then creates a file called APPLI3 (see Appendix 2), which it will then place in a specific directory called "/var/madison/tuxedo/tga" known to the service TTH. TTH will then automatically use the file APPLI3.tux to support the new application APPLI3.

Appendix 1

| | | |
|---|---|---|
| L1: Name | APPLI3 | The name of application to be managed |
| L2: Administrator | | Connection name of the administrator of the application; If this field cannot be filled in, the question will be asked by the integration script. |
| L3: Master | | Name of the Master machine obtained by the command "uname-n". If this field cannot be filled in, the question will be asked by the integration script. |
| L4: Directory of the Tuxedo software | /usr/tuxedo | usually "/usr/tuxedo" |
| L5: Directory of the Application | /flowbus/home/demofb1/bin | In this directory are: the executable files of the application servers; the ASCI configuration file (the file UBBCONFIG or UBB) and the binary configuration file (TUXCONFIG). |
| L6: Absolute access path of the binary configuration file | /flowbus/home/demofb1/data | for example: <directory_of_application>/tuxconfig |
| L7: Configuration file of the Application, in ASCII | /flowbus/home/demofb1/ubbc | If the access path is not specified, this file is entered into the directory of the application (APPDIR). |
| L8; Local language | C | If the messages from the |

Appendix 1-continued

| | | |
|---|---|---|
| L9: Access path to the library | /flowbus/install/lib:/usr/ | Tuxedo catalog have not been translated and adapted (Localized), set this field at "C" (capital C). usually /usr/tuxedo/lib. You can indicate several separate access paths using (colon). |
| L10: Environment file | /flowbus/home/demofb1/envf | The access path of the file which contains the variables to be added to the environment for all the servers of the machine (for example, information on data compression, load distribution in the network, etc.). |
| Script Generation | | |

Appendix 2

File: APPLI3.tux
APPNAME = "APPLI3"; export APPNAME
ADMIN = "demofb1"; export ADMIN # on site input
MASTER = "orage"; export MASTER # on site input
TUXDIR = "/usr/tuxedo"; export TUXDIR
APPDIR = "/flowbus/home/demofb1/bin"; export APPDIR
TUXCONFIG = "/flowbus/home/demofb1/data/TUXCONFIG"; export TUXCONFIG
UBBFILE = "/flowbus/home/demofb1/ubbconfig"; export UBBFILE
LANG = "C"; export LANG
LIBPATH = "/flowbus/install/lib:/isr/tuxedo/lib:/usr/lib"; export LIBPATH
ENVFILE = "flowbus/home/demofb1/envfile"; export ENVFILE While the preferred forms and embodiments of the invention have been illustrated and described, it will be apparent to those of ordinary skill in the art that various changes and modifications may be without deviating from the inventive concept and spirit of the invention as set forth above, and it is intended by the appended claims to define all such concepts which come within the full scope and true spirit of the invention.

We claim:

1. An application integration tool (INTO) for integrating applications (APC) into a data processing platform (PL) constituted by a network of machines running a plurality of specific services (SERV) of the platform, characterized in that the application integration tool comprises:

means (MSIG) for entering, from a new application (APC), integrating information for integrating said new application so as to allow the new application to be supported by all or some of the services, and means (MCONV) for converting the integration information into a set of script commands (SCRi) executed at an end of an installation procedure of the new application (APC) for reconfiguring the services (SERV) in order to take into account the new application (APC).

2. The tool (INTO) for integrating applications (APC) for a data processing platform (PL) according to claim 1, characterized in that the entry means (MSIG) comprise means (MACQ) for acquiring information on properties of the application to be integrated and a graphical interface (IGC) for collecting said information in the properties and transmitting said information to the conversion means.

3. The tool (INTO) for integrating applications for a data processing platform according to claim 1 characterized in that the conversion means (MCONV) are constituted by software (PROG) which produces, from said properties information, scripts (SCRi) specific to each service which allow the application (APC) to be automatically integrated into the services (SERV).

4. An application integration tool (INTO) for integrating applications (APC) into a data processing platform (PL) constituted by a network of machines running a plurality of specific services (SERV) of the platform, characterized in that the application integration tool comprises:

means (MSIG) for entering, from a new application (APC), integrating information for integrating said new application to allow the new application to be supported by all or some of the services, said means for entering (MSIG) comprising acquisition means (MACQ) for acquiring information on properties of the application to be integrated and a graphical interface (IGC) for collecting said information on the properties and transmitting said information, said acquisition means (MACQ) comprising a set of forms (FORM), each of which corresponds to a predetermined service and which is supplied to software or a human operator responsible for integrating said application (APC), and conversion means (MCONV) for receiving the transmitted information and converting the integration information into a set of script commands (SCRi) executed at an end of an installation procedure of the new application (APC) for reconfiguring the services (SERV) in order to take into account the new application (APC).

5. An application integration tool (INTO) for integrating applications for a data processing platform (PL) according to claim 4, characterized in that the forms (FORM) are specific forms in a standardized Hyper Text Markup Language (HTML) and, the software (PROG) which generates the scripts is a standardized Common Gateway Interface (CGI) program.

* * * * *